United States Patent
Jarnail et al.

(10) Patent No.: US 6,565,151 B2
(45) Date of Patent: May 20, 2003

(54) VEHICLE PASSENGER SEAT

(75) Inventors: Mandeep Jarnail, Conventry (GB); Jasbir Singh Rana, Canterbury (GB)

(73) Assignee: Britax Aircraft Interiors Limited, Warwick (GB)

(*) Notice: Subject to any disclaimer, the term of this patent is extended or adjusted under 35 U.S.C. 154(b) by 0 days.

(21) Appl. No.: 09/946,076

(22) Filed: Sep. 4, 2001

(65) Prior Publication Data

US 2002/0033622 A1 Mar. 21, 2002

(30) Foreign Application Priority Data

Sep. 15, 2000 (GB) .............................. 0022628

(51) Int. Cl.[7] ............................................... B60N 2/42
(52) U.S. Cl. ...................... 297/216.16; 297/216.1; 297/216.19; 297/216.2; 244/122 R
(58) Field of Search ...................... 297/216.19, 216.2, 297/216.16, 216.1; 244/122 R; 296/68.1; 248/631

(56) References Cited

U.S. PATENT DOCUMENTS

| | | | | |
|---|---|---|---|---|
| 2,933,127 A | * | 7/1960 | Brewster | 297/216.2 |
| 3,460,791 A | * | 8/1969 | Judd | 297/216.1 |
| 3,603,638 A | * | 9/1971 | McGregor et al. | 297/216.2 |
| 4,349,167 A | * | 9/1982 | Reilly | 297/216.2 |
| 4,440,441 A | * | 4/1984 | Marrujo et al. | 297/216.2 |
| 4,487,383 A | * | 12/1984 | Mazelsky | 297/216.2 |
| 4,630,864 A | * | 12/1986 | Toll | 297/216.1 X |
| 4,861,103 A | * | 8/1989 | Vallee | 297/216.2 |
| 4,911,381 A | * | 3/1990 | Cannon et al. | 297/216.2 |
| 5,152,578 A | * | 10/1992 | Kiguchi | 297/216.16 |
| 5,338,090 A | * | 8/1994 | Simpson et al. | 297/216.2 |
| 5,454,622 A | * | 10/1995 | Demopoulos | 297/216.1 X |
| 5,499,783 A | * | 3/1996 | Marechal | 297/216.2 X |
| 5,657,950 A | * | 8/1997 | Han et al. | 244/122 R |
| 5,730,492 A | | 3/1998 | Warrick et al. | 297/216.2 |
| 6,257,663 B1 | * | 7/2001 | Swierczewski | 297/216.19 X |
| 6,312,050 B1 | * | 11/2001 | Eklind | 297/216.2 X |
| 6,334,643 B1 | * | 1/2002 | Linblad et al. | 297/216.19 X |
| 6,406,092 B1 | * | 6/2002 | Cordes et al. | 297/216.19 X |

FOREIGN PATENT DOCUMENTS

| | | | |
|---|---|---|---|
| DE | 35 33 132 A1 | 3/1987 | B64D/25/04 |
| GB | 1 259 198 | 1/1972 | F16F/7/12 |
| GB | 2243540 A | 11/1991 | |
| WO | 92/05072 | 4/1992 | B64D/11/06 |

* cited by examiner

Primary Examiner—Peter R. Brown
Assistant Examiner—Rodney B. White
(74) Attorney, Agent, or Firm—Davis & Bujold, P.L.L.C.

(57) ABSTRACT

A leg assembly for a vehicle passenger seat comprises a front leg frame and a rear leg comprising a first link pivotally connected at a first end to the rear foot, a second link pivotally connected at a first end to an intermediate point on the leg frame and a load-limiting strut pivotally connected at a first end to the front foot and pivotally connected at a second end to both the second end of the first link and the second end of the second link. The load-limiting strut is arranged to resist movement of the first and second links into alignment with each other, but to yield when subject to a load exceeding a predetermined value, thereby allowing the seat to pivot forwardly about its front foot.

20 Claims, 4 Drawing Sheets

VEHICLE PASSENGER SEAT

FIELD

This invention relates to a passenger seat for a vehicle such as an aircraft and more particularly to a leg assembly for such a passenger seat, comprising a front foot, a leg frame mounted on the front foot and having spaced support surfaces for engaging with transverse members of the seat, a rear foot, and a load-limiting rear leg extending from the rear foot to an intermediate point on the leg frame so as to inhibit angular movement of the leg frame about the front foot.

RELATED ART

Passenger seats in aircraft are commonly attached to the floor of the aircraft using attachment fittings that are mounted in longitudinal tracks in the floor of the aircraft. When such an aircraft is subject to sudden deceleration, for example during crash, the seats tend to pivot about their front attachment points, applying a considerable load to the tracks at their rear attachment points. Recently, it has been found that such rear attachment points are subject to a dynamic load which is substantially greater than was provided for during the design of many aircraft currently in service. Accordingly, seats of the type described above have been designed to reduce the maximum level of such dynamic load by providing a degree of shock absorption.

U.S. Pat. No. 5,730,492 describes a seat of this type in which the load-limiting.rear leg comprises a load-limiting strut extending from the rear foot to said intermediate point on the leg frame. This strut yields when subject to a load exceeding a predetermined value, allowing the seat to pivot forwardly about its front feet. When the strut has extended to its maximum length, it is subject to the full load between the leg frame and the rear foot. It is an object of the invention to avoid applying this load directly to the load-limiting strut.

SUMMARY OF THE INVENTION

According to the invention, in a leg assembly of the type described above, the rear leg comprises a first link pivotally connected at a first end to the rear foot, a second link pivotally connected at a first end to said intermediate point on the leg frame and a load-limiting strut pivotally connected at a first end to the front foot and pivotally connected at a second end to both the second end of the first link and the second end of the second link so as to resist movement of the first and second links into alignment with each other.

DETAILED DESCRIPTION OF THE PREFERRED EMBODIMENT

Figure 1:
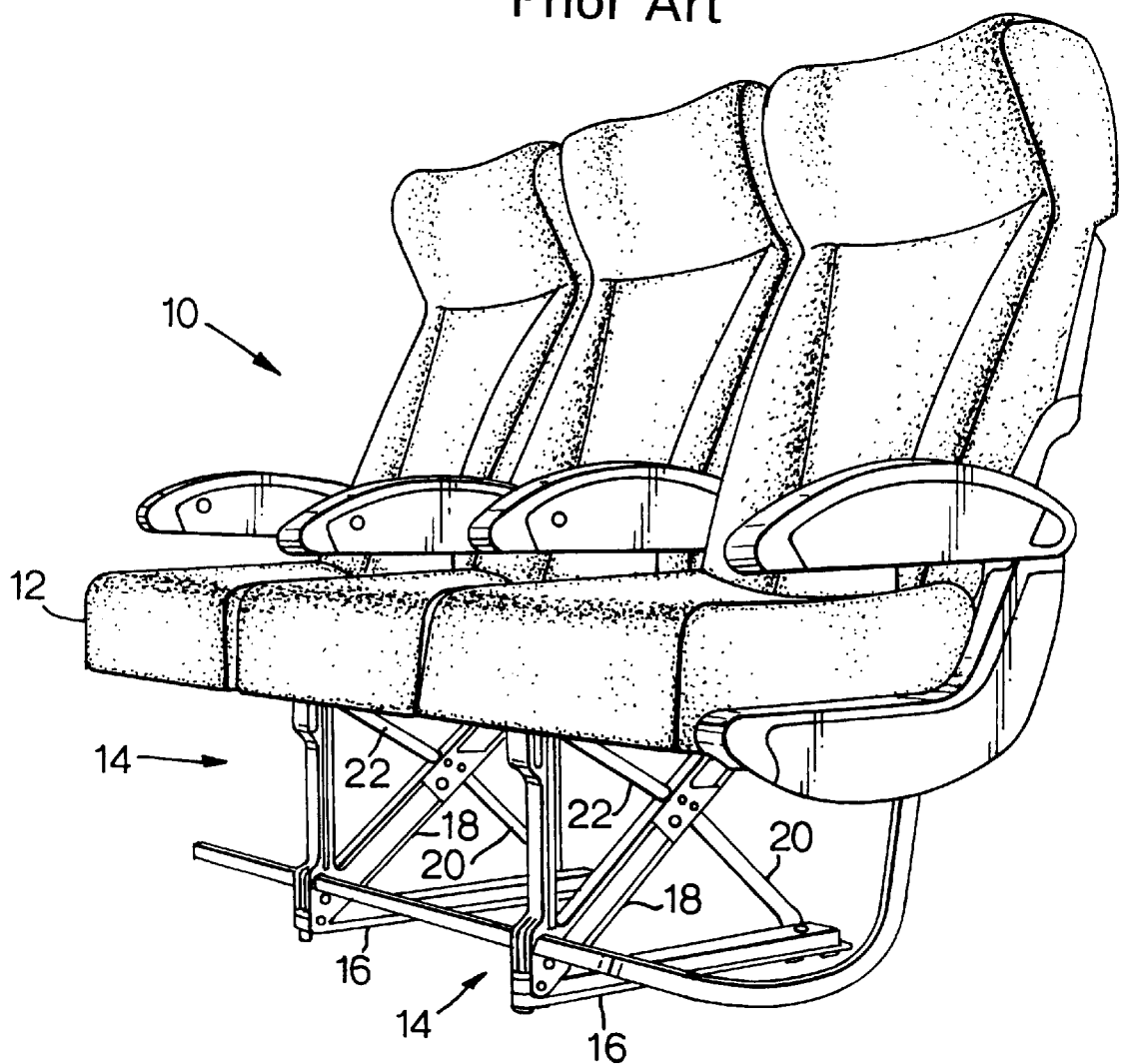
FIG. 1 is a schematic perspective view of a complete seat assembly of the type described in U.S. Pat. No. 5,730,492.

FIG. 1 shows a seat assembly 10 which includes a typical upper seat portion 12 and two identical leg assemblies 14. Each leg assembly includes a base member 16, a V-shaped leg frame 18, a load-limiting strut 20 and a tension link 22.

Figure 2:
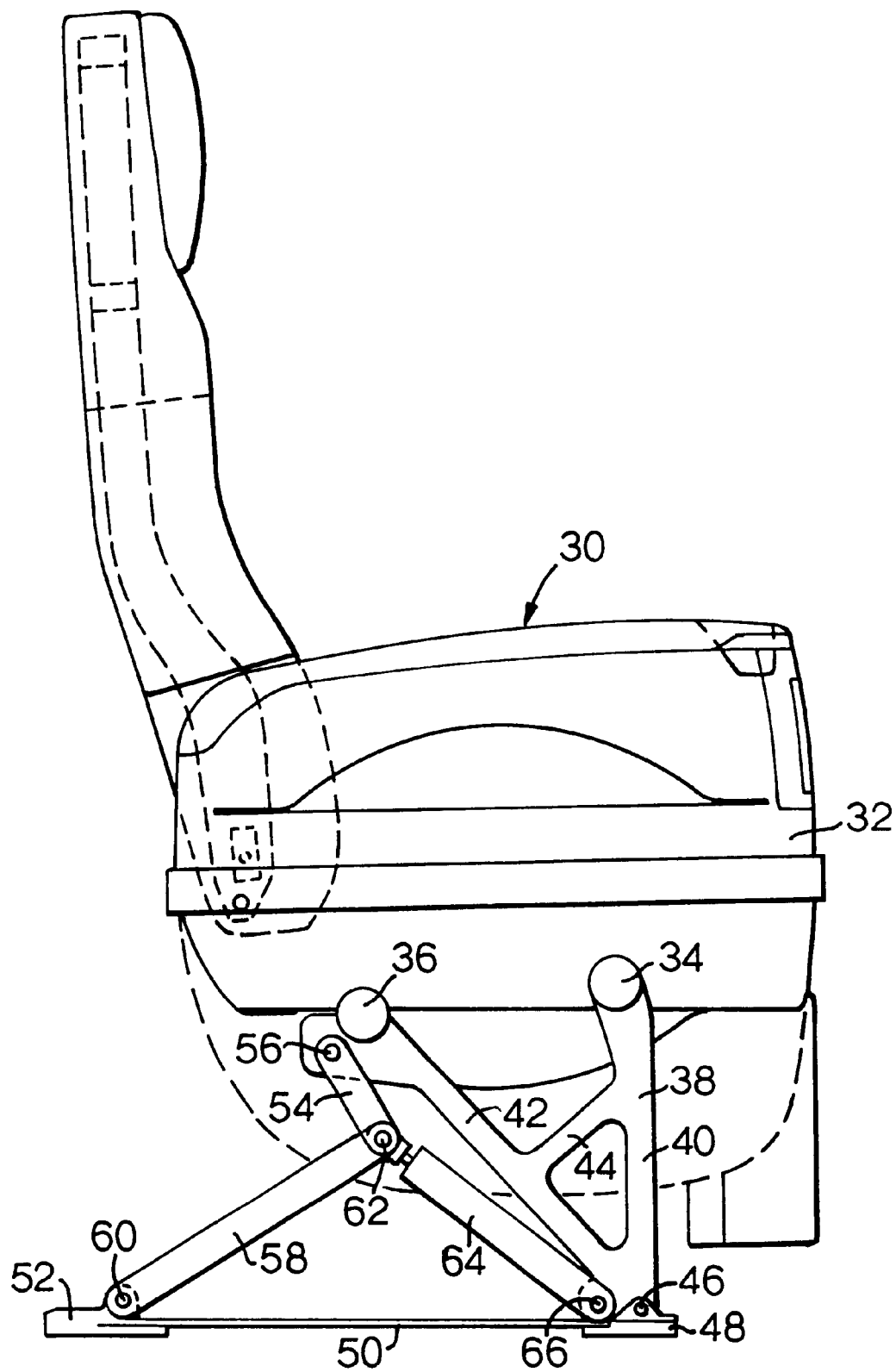
FIG. 2 is a schematic side view of a seat in accordance with the invention in its position of normal use.

FIG. 2 shows a seat 30 in accordance with the invention, having an upper seat body 32 secured to front and rear transverse spars 34 and 36 which are supported on V-leg frames 38, only one of which is visible in the drawing. The V-leg frames 38 are formed in one piece but their structure is similar to that of the V-legs 14 of FIG. 1, in that they have vertical members 40, diagonal members 42 and tension links 44. The bottoms of the V-leg frames 38 are mounted by pivot pins 46 on respective front feet 48 which are connected by base links 50 to corresponding rear feet 52. The front and rear feet 48 and 52 are adapted to engage with tracks in an aircraft cabin floor as described in U.S. Pat. No. 5,730,492.

The upper end of the diagonal member 42 of each V-leg 38 is pivotally connected to an upper rear link 54 by a pivot pin 56. A lower rear link 58 is pivotally connected at one end to the rear foot 52 by a pivot pin 60. The other ends of the links 54 and 58 are pivotally interconnected by a pivot pin 62. The length of the links 54 and 58 is such that, when the upper seat body 30 is in its normal orientation, the pivot pin 62 is further forward than the straight line position between the pivot pin 56 on the V-leg 38 and the pivot pin on the rear foot 52. The pivot pin 62 is held in this position by a load-limiting strut 64.

In normal use, the strut 64 is in compression. If the aircraft is subject to sudden deceleration, for example during a crash, a load is applied by a seat occupant to the upper seat body 32 via a seat belt (not shown). This tends to cause the entire seat 30 to pivot about the pivot pins 46 attaching the V-legs 40 to their respective feet 48. The load-limiting strut 64 associated with each V-leg frame 38 is now in tension, applying an upward load to the corresponding rear foot 52. In order to limit this upward load, the strut 64 is designed to stretch when such load exceeds a predetermined threshold value. This allows the seat 30 to pivot forwards thus reducing the peak dynamic load applied to the rear feet 52. If the seat 30 were to reach the position shown in FIG. 3, the links 54 and 58 would be almost, but not completely, in alignment with one another. Further extension of the strut 64 is prevented by a stop therein, as will be explained hereinafter. Normally, the peak dynamic load is insufficient to stretch the strut to this extent.

Figure 4:
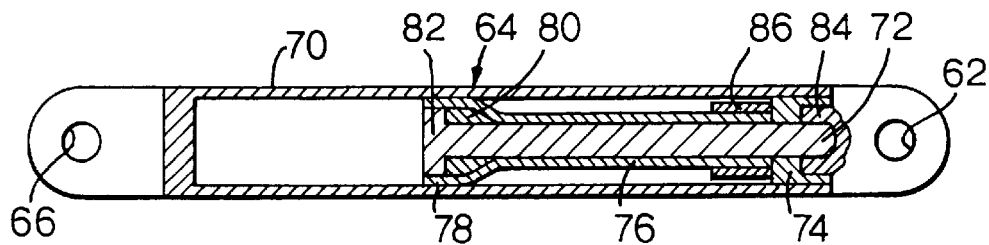
FIG. 4 is a sectional view of a load-limiting strut for the seat shown in FIGS. 2 and 3 in its position of normal use.

Referring to FIG. 4, the load-limiting strut 64 comprises a cylinder 70 which is connected by the pivot pin 66 to the front foot 48 and a piston 72 which projects through an end closure 74 at the end of the cylinder 70 opposite to the pivot pin 66. Outside the end closure 74, the piston 72 is coupled to the pivot pin 62 at the junction between the links 54 arid 58. Within the cylinder 70, the piston 72 is surrounded by a deformable sleeve 76, one end of which abuts against the inner face of the end closure 74. The inner end of the sleeve 76 comprises an outwardly flared portion 78, the inner surface of which is engaged by a hardened thrust member 80 which is slidably mounted on the piston 72 so as to abut against an end stop 82 thereon.

Figure 5:
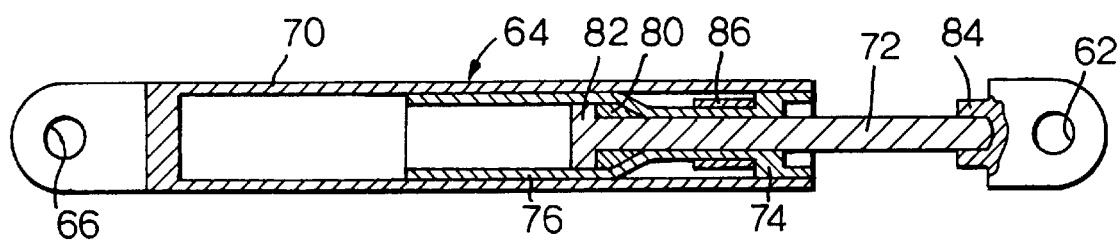
FIG. 5 is a sectional view of the strut shown in FIG. 4 during a crash.

In normal use, an enlarged diameter shoulder 84 on the outer end of the piston 72 engages with the outer surface of the end closure 74, thus allowing the strut to resist compression in normal use. In the event of sudden deceleration, the strut 64 is put into tension. If the above mentioned predetermined threshold is exceeded, the piston pulls the hardened member 80 outwardly, deforming the sleeve 76 as shown in FIG. 5. If the strut was stretched to the extent shown in FIG. 3, the hardened member 80 would deform the sleeve 76 as far as an outer reinforcing sleeve 86 thereon which thus serves as the above mentioned stop.

Figure 6:
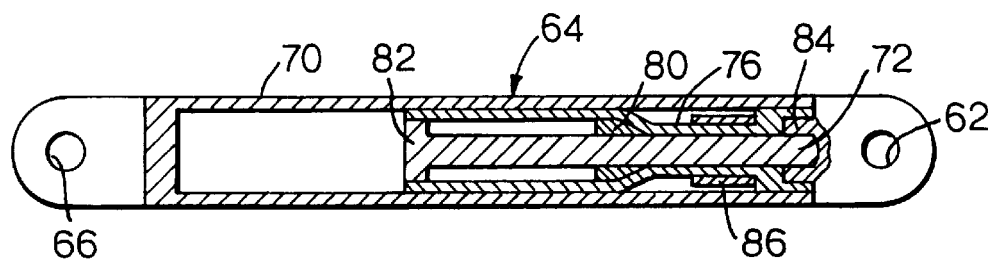
FIG. 6 is a sectional view of the strut shown in FIGS. 4 and 5 after a crash.

When the decelerating force ceases, the weight of the passenger on the seat 30 pushes the piston 72 back into the cylinder 70, as shown in FIG. 6, the hardened member 80 remaining embedded in the sleeve 76, as shown in FIG. 6.

Figure 3:
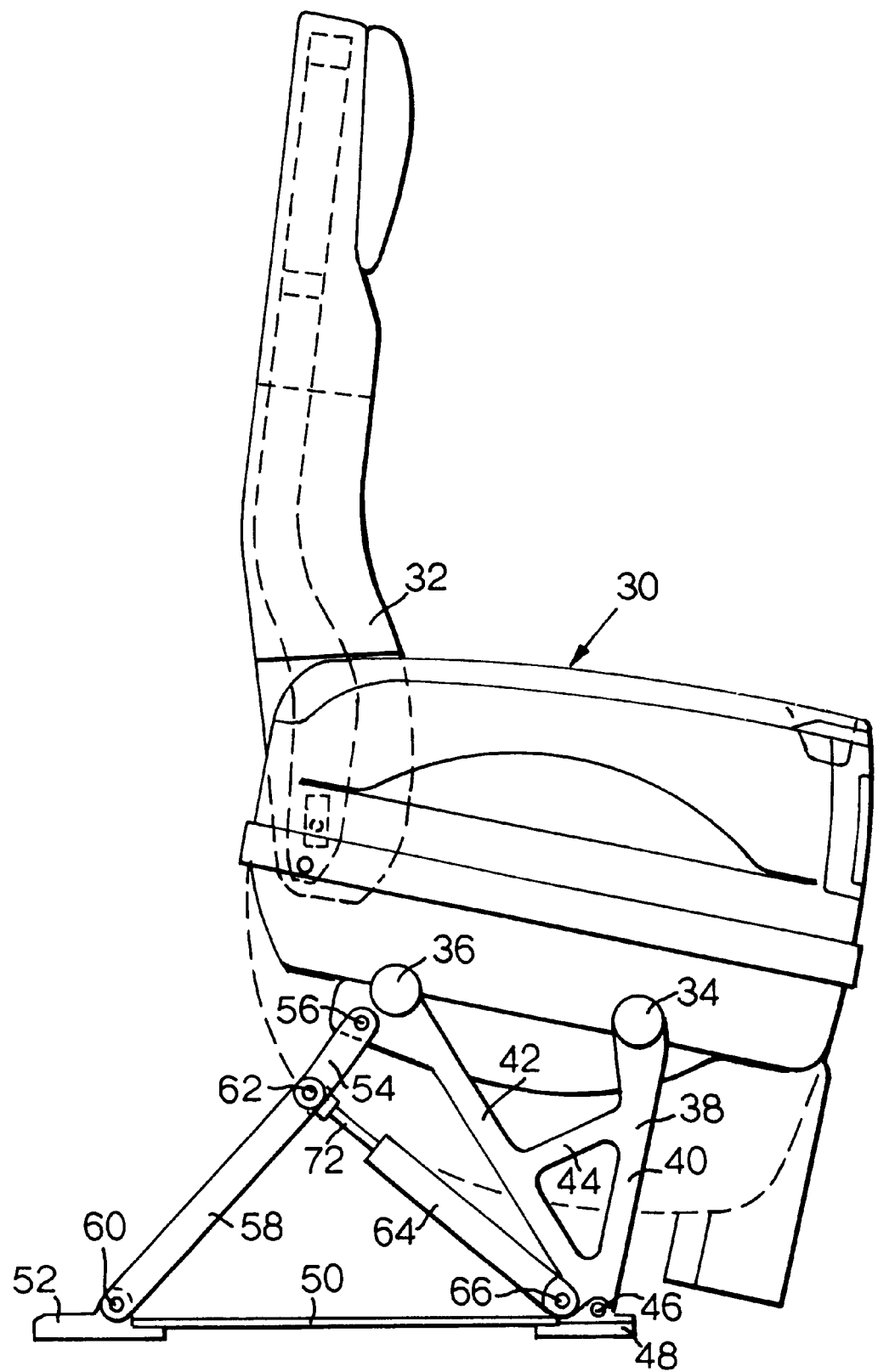
FIG. 3 is a schematic side view of the seat shown in FIG. 2 as it is pitching forward during a crash.

The seat shown in FIGS. 2 and 3 provides more leg room than the seat shown in FIG. 1 because, in normal use, the parts of the links 54 and 58 adjacent to pivot pin 62 are further forward than the corresponding part of the strut 20.

What is claimed is:

1. A leg assembly for a vehicle passenger seat, comprising a front foot, a leg frame mounted on the front foot and having spaced support surfaces for engaging with transverse members of the seat, a rear foot, and a load-limiting rear leg extending from the rear foot to the leg frame so as to inhibit angular movement of the leg frame about the front foot, wherein the rear leg comprises a first link pivotally connected at a first end to the rear foot, a second link pivotally connected at a first end to the leg frame while a second end of the second link is pivotally connected to a second end of the first link and a load-limiting strut pivotally connected at a first end to the front foot and pivotally connected at a second end to both the second end of the first link and the second end of the second link so as to resist movement of the first and second links into alignment with each other.

2. A leg assembly according to claim 1, wherein the leg frame comprises a V-shaped front leg having a substantially vertical front limb extending from the front foot to support a front part of the seat and a diagonal limb extending from the front foot to support a rear part of the seat.

3. A leg assembly according to claim 2, wherein the front foot is connected to the rear foot by a base member.

4. A leg assembly according to claim 3, wherein the load-limiting strut includes a deformable member and a deforming member arranged to cause deformation of the deformable member when the load on the strut exceeds a predetermined value.

5. A leg assembly according to claim 4, wherein the deformable member comprises a tube and the deforming member comprises a tapering member having a narrow end smaller than the internal width of the tube and a wide end larger than the internal width of the tube.

6. A leg assembly according to claim 5, wherein the load-limiting strut comprises a cylinder accommodating the deformable member and a piston carrying the deforming member.

7. A leg assembly according to claim 2, wherein the load-limiting strut includes a deformable member and a deforming member arranged to cause deformation of the deformable member when the load on the strut exceeds a predetermined value.

8. A leg assembly according to claim 7, wherein the deformable member comprises a tube and the deforming member comprises a tapering member having a narrow end smaller than the internal width of the tube and a wide end larger than the internal width of the tube.

9. A leg assembly according to claim 8, wherein the load-limiting strut comprises a cylinder accommodating the deformable member and a piston carrying the deforming member.

10. A leg assembly according to claim 1, wherein the load-limiting strut includes a deformable member and a deforming member arranged to cause deformation of the deformable member when the load on the strut exceeds a predetermined value.

11. A leg assembly according to claim 10, wherein the deformable member comprises a tube and the deforming member comprises a tapering member having a narrow end smaller than the internal width of the tube and a wide end larger than the internal width of the tube.

12. A leg assembly according to claim 11, wherein the load-limiting strut comprises a cylinder accommodating the deformable member and a piston carrying the deforming member.

13. A vehicle passenger seat having a leg assembly comprising a front foot, a leg frame mounted on the front foot and having spaced support surfaces for engaging with transverse members of the seat, a rear foot, and a load-limiting rear leg extending from the rear foot to the leg frame so as to inhibit angular movement of the leg frame about the front foot, wherein the rear leg comprises a first link pivotally connected at a first end to the rear foot, a second link pivotally connected at a first end to the leg frame while a second end of the second link is pivotally connected to a second end of the first link and a load-limiting strut pivotally connected at a first end to the front foot and pivotally connected at a second end to both the second end of the first link and the second end of the second link so as to resist movement of the first and second links into alignment with each other.

14. A vehicle passenger seat according to claim 13, wherein the leg frame comprises a V-shaped front leg having a substantially vertical front limb extending from the front foot to support a front part of the seat and a diagonal limb extending from the front foot to support a rear part of the seat.

15. A vehicle passenger seat according to claim 14, wherein the load-limiting strut includes a deformable member and a deforming member arranged to cause deformation of the deformable member when the load on the strut exceeds a predetermined value.

16. A vehicle passenger seat according to claim 15, wherein the deformable member comprises a tube and the deforming member comprises a tapering member having a narrow end smaller than the internal width of the tube and a wide end larger than the internal width of the tube.

17. A vehicle passenger seat according to claim 16, wherein the load-limiting strut comprises a cylinder accommodating the deformable member and a piston carrying the deforming member.

18. A vehicle passenger seat according to claim 13, wherein the load-limiting strut includes a deformable member and a deforming member arranged to cause deformation of the deformable member when the load on the strut exceeds a predetermined value.

19. A vehicle passenger seat according to claim 18, wherein the deformable member comprises a tube and the deforming member comprises a tapering member having a narrow end smaller than the internal width of the tube and a wide end larger than the internal width of the tube.

20. A vehicle passenger seat according to claim 19, wherein the load-limiting strut comprises a cylinder accommodating the deformable member and a piston carrying the deforming member.

* * * * *